United States Patent Office 3,501,096
Patented Mar. 17, 1970

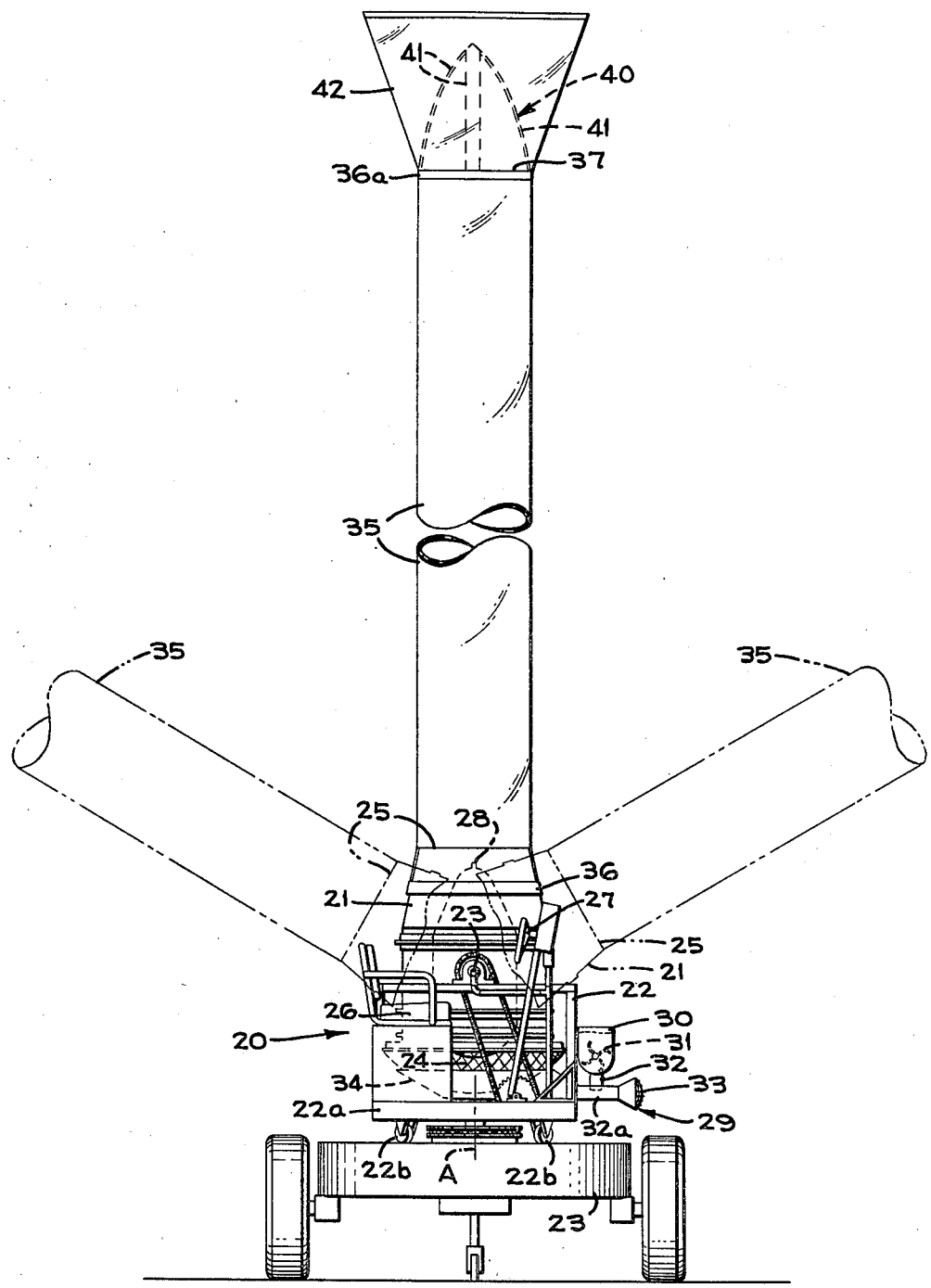
FIG_1

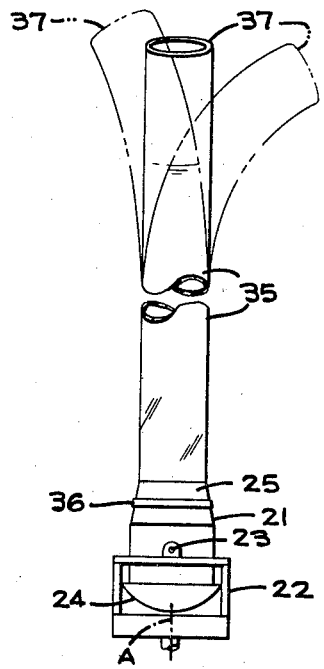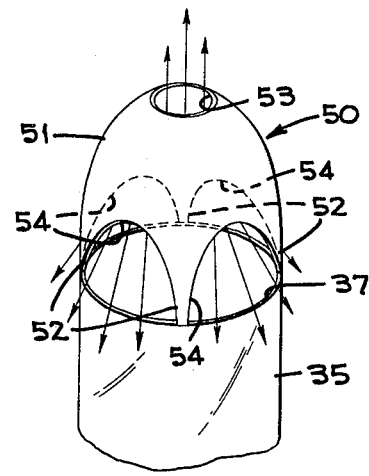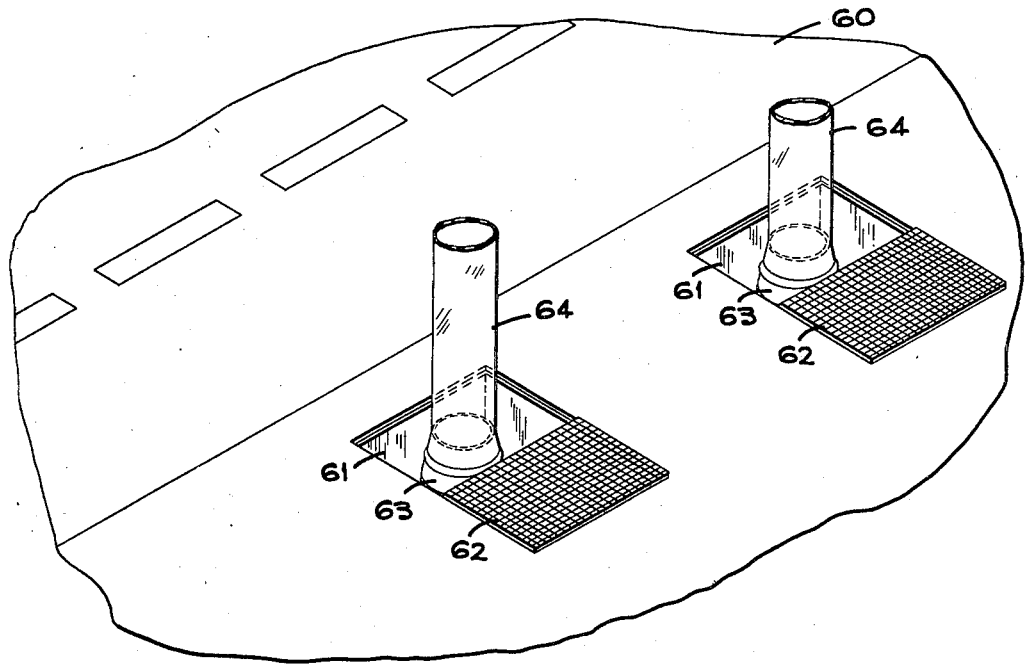

3,501,096
FOG DISPERSION DEVICE
Robert E. Stilwell and Dean T. McDonald, Santa Clara, Calif., assignors to FMC Corporation, San Jose, Calif., a corporation of Delaware
Filed Jan. 11, 1968, Ser. No. 697,045
Int. Cl. A01g 15/00
U.S. Cl. 239—14                                10 Claims

ABSTRACT OF THE DISCLOSURE

A tube of plastic-material such as polyethylene when secured to a blower such as an axial flow fan is extendable into the air for 125 feet or more to discharge air, chemicals and the like from the end of the tube for dispersing fog, spraying trees, and the like.

BACKGROUND OF THE INVENTION

Airport use is greatly restricted during fog conditions. Various methods and techniques have been tried to eliminate the fog at an airport so that planes may land safely rather than being diverted to other airports. Considerable additional expense is involved when planes land at fields other than their destination, and passenger inconvenience is great.

Attempts have been made to fly small aircraft over fog covered runways to drop such chemical as iodide crystals, Dry Ice or the like to reduce the effect of the fog so that larger commercial aircraft may land. However, such flying, even by small aircraft is dangerous, and creates a hazardous traffic situation over the runway.

It is to the problem of fog dispersion that the invention is directed.

SUMMARY OF THE INVENTION

This invention relates to apparatus for maintaining a length of tubing in the air by directing a flow of fluid therethrough, and more particularly relates to means for forcefully blowing air through a length of polyethylene tubing to effectuate a self-standing column of tubing, wherein the air is discharged from the uppermost end. The addition of chemicals to the stream of air from the blower can be used for fog dispersion, spraying high trees and the like.

It is therefore an object of the invention to provide an elongated tubular structure maintainable in an upstanding position by air forced therethrough.

It is another object of the invention to provide a length of plastic tubing adapted to be coupled to a blower for inflatably maintaining said tubing in a self-substaining upright condition.

It is a further object of the invention to provide an elongate plastic tube extendable and inflatable by blowing air therethrough, wherein chemicals may be added to the air stream for discharge of said chemicals at the uppermost end of the inflatable extended plastic tube.

Another object of the invention is to provide an elongated plastic tube inflatable and extendable by an air blower wherein pivoting of the air blower allows said inflated and extended tube to pivot therewith.

It is still another object of the invention to provide a means for facilitating the inflation and extension of a flexible plastic tube and the dispersion of chemicals and the like from the end of the tube.

It is a further object of the invention to provide a more efficient means for dispersing chemicals at various heights above ground for fog dispersion, spraying of trees and the like.

It is still another object of the invention to provide an upstanding plastic tube having a light means for warnings, displays, and the like.

DESCRIPTION OF THE DRAWINGS

FIGURE 1 is an elevation of the apparatus of the present invention with the plastic tube of the apparatus being broken away so that only a small portion of its actual length is illustrated.

FIGURE 2 is a diagrammatic elevation, particularly showing one embodiment of the plastic tube and indicating in phantom lines the action of the upper end of the tube during operation of the apparatus.

FIGURE 3 is a fragmentary perspective showing one embodiment of a nozzle adapted for connection to the outer end of the plastic tube.

FIGURE 4 is a fragmentary perspective view showing an embodiment of the present invention that is adapted for mounting in compartments provided in the ground alongside an airport runway.

DESCRIPTION OF THE PREFERRED EMBODIMENT

In the embodiment of the invention shown in FIGURE 1 the reference numeral 20 indicates a machine for generating and discharging a blast of air. This machine is substantially identical to that disclosed in U.S. Patent No. 2,768,859 and reference may be had to this patent, which is incorporated by reference herein, for a detailed description of the construction and operation of the machine. In general, the machine includes a blower assembly 21 mounted on a frame 22 for pivotal movement about a horizontal axis 23 so that the operator can control the angular positioning of the discharge outlet 25 of the blower assembly as described in U.S. Patent No. 2,768,859. It should also be noted that frame 22 is rotatably mounted by means of a turntable 22a and wheels 22b on a mobile carrier frame 23 for movement around a vertical axis A. Thus the blower assembly has the versatility of being positionable in a variety of angular positions for directing air blasts from the horizontal to a vertical position. The rotation of the blower assembly and frame 22 about axis A allows a 360° sweep of the air blast.

Power for the axial blower assembly 21 is provided as described with the said patent for driving the impeller of the blower and air is drawn in through protective screen 24 and discharged through the outlet 25. In the preferred embodiment the amount of air discharged can be as high as 60,000 c.f.m.

For convenience, the operator is seated on a seat 26 to operate the controls 27 to position the axial blower assembly in the desired direction and attitude.

Liquid chemicals may be injected into the discharged air blast as by a nozzle 28, also described in the aforementioned patent. In this way, the liquid chemicals are carried along with the air blast from outlet 25. In accordance with the present invention, the air blast machine disclosed in Patent No. 2,768,859 is modified only by installing a dry chemical feeder 29 adjacent the inlet of the blower. The feeder 29 comprises a hopper 30 having a power driven paddle unit 31. The paddles agitate the chemicals and feed them downwardly through a vertical conduit 32 into a tube 32a. The inlet end of the tube 32a carries a screen 33 while the discharge end communicates with a bowl-like receptacle 34 that is curved to conform to the curvature of the screen 24 of the blower and to permit pivoting movement of the suction end of the blower while maintaining flow communication with the receptacle 34. Iodide crystals are but one example of the chemicals that can be fed from feeder 29.

In the preferred embodiment, a tube 35 of polyethylene material approximately 4 mils thick is secured to the outlet 25 of the axial blower assembly 21 as by a circular clamping band 36. The tube 35 is approximately 38 inches in diameter and may be 150 feet long. When the axial blower assembly is in operation, the air blast from outlet 25 causes the tube 35 to extend to its full width and length to discharge the air blast from the outlet 37 of the tube 35.

In the embodiment of FIGURE 2 the end 37 of the tube is completely unrestrained and the air blast from the tube causes a whipping action of the upper end portion substantially as indicated in phantom lines. This is a random action and results in a dispersion of the air blast and any chemicals contained therein in a variety of directions from the end of tube 35 to effectively cover a large area relative to end 37.

At the end of tube 35 of the embodiment of FIGURE 1, a dispersion assembly or nozzle 40 is provided which comprises a plurality of polyethylene straps 41 secured at their lower ends to tube 35. The straps may be secured together at their upper ends to form a lift unit. A truncated cone 42 of plastic material is also secured to tube 35 at outlet 37 as by a clamping ring 36a. The straps 41 afford a resistance to the air blast at outlet 37 and thus aid in lifting the tube to its full extent and in maintaining the tube in a substantially extended position during operation. The cone portion 42 aids in dispersion of the air blast and any chemicals therein by the action of the cone as the air blast passes therethrough.

It should be noted that the tube 35 as extended and filled by the air blast is capable of being moved in a wand-like manner as shown in FIGURE 1. For example, it would be possible to pull the blower assembly down a roadway or a runway with the blower assembly being pivoted about axis 23 back and forth to thereby move the extended tube 35 like a wand to spread air chemicals over a wide area. Thus by the use of chemicals effective for combating cold or warm fog, the tube 35 would disperse such chemicals to such an extent as to reduce the fog condition within reach of the end of the tube 35, which may be as high as 150 feet in the air or more.

FIGURE 3 discloses another form of nozzle which also assists in extending the tube 35 when the axial blower assembly is in operation. The nozzle 50 comprises a plastic sheet 51 having four strap members 52 secured by a suitable attachment to the outlet end 37 of tube 35. An opening 53 is also provided in the upper central portion of sheet 51. Thus it can be seen that the air blast fills the sheet 51 and the air blast, and any chemicals therein, are discharged through the opening 53 and through openings 54 defined between the straps 52 to disperse the air and chemicals at the end of the tube 35 in the directions indicated by the arrows in FIGURE 3.

The material for the tube 35 may be of plastic sheet film material such as polyethylene, or of a woven fabric such as nylon, or paper.

FIGURE 4 is a perspective view of a portion of an airport along a runway 60, with recessed compartments 61 provided alongside the runway at spaced intervals. The compartments 61 are large enough to contain an axial blower assembly 63 with a tube 64 mounted thereon. The blower assembly 63 may be identical to the blower assembly 21 of FIGURE 1 except that it can be mounted on a fixed base instead of on the mobile frame 23. When the tube 64, which is identical to tube 35, is not extended by the air blast from assembly 63, it is disposed in collapsed condition in the compartment and a protective grid 62 is moved into place to cover the opening to the compartment. When it is desired to extend the tube 64, the grid 62 is moved to one side to allow extension of the tube 64 by the air blast from assembly 63. Chemicals added to the air blast, as hereinabove described, are dispersed from the end of each tube 64 to disperse fog or the like along the runway 60.

Thus an elongated plastic tube has been described as attached to a blower wherein the air from the blower assists in elongating the tube and also maintains the tube in an elongated position. With the introduction of chemicals or the like into the air through the blower, it is possible to create a dispersion of chemicals and air at the far end of the elonagted tube. As the tube may be in lengths up to 150 feet, the combined blower and tube may be used for spraying chemicals for fog dispersion, for reaching tall trees, or even for the pollination of tall tree crops such as dates. Further, since the tube is maintained in an elongate condition, and could be used with interior or exterior lighting, the blower and tube could be used for lighted advertising displays. Noteworthy, also, is the fact that the elongated tube can be moved in wand-like fashion upon pivoting the blower assembly and rotating it relative to its support.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, we claim:

1. A fog dispersing and spraying apparatus comprising in combination, a large diameter collapsible tube having sufficient length to extend from ground level high into the atmosphere, at least one fluid discharge opening in said tube, and means for blowing a volume of compressible fluid into said tube at a rate and velocity sufficient to both distend and erect the tube to an upstanding position for delivery of the fluid into the atmosphere.

2. The apparatus of claim 1 wherein said tube is a cylinder.

3. The apparatus of claim 1 wherein said tube is made of a polyethylene material.

4. The apparatus of claim 1 wherein said tube is pivotally mounted for movement about a horizontal axis.

5. The apparatus of claim 4 wherein the tube is also mounted for rotation about a vertical axis.

6. The apparatus of claim 1 wherein said tube is approximately 125 feet in length.

7. The apparatus of claim 1 further including means for introducing an additive into said fluid so that the additive will be discharged into the atmosphere along with the said fluid.

8. The apparatus of claim 7 wherein the means for introducing an additive is a means for introducing a chemical.

9. The apparatus of claim 1 further including an air lift unit at the extended end of said tube to assist in lifting the said tube to its full extent and in mainaining said tube in a substantially extended position.

10. The apparatus of claim 9 wherein said air lift unit is an air baffle with openings adjacent thereto through which the said fluid is discharged.

References Cited

UNITED STATES PATENTS

| | | | |
|---|---|---|---|
| 1,958,385 | 5/1934 | Swеelland | 239—204 |
| 1,974,538 | 9/1934 | Johnston | 239—77 X |
| 2,752,195 | 6/1956 | Whitehead | 239—206 |
| 2,768,859 | 10/1956 | Patterson | 239—77 |
| 2,901,183 | 8/1959 | Kohl | 239—205 |
| 2,921,743 | 1/1960 | Westover et al. | 239—189 |
| 2,954,932 | 10/1960 | Albano | 239—188 |

ROBERT B. REEVES, Primary Examiner

H. S. LANE, Assistant Examiner

U.S. Cl. X.R.

239—77, 204, 281, 588

UNITED STATES PATENT OFFICE
CERTIFICATE OF CORRECTION

Patent No. 3,501,096          Dated March 17, 1970

Inventor(s)     Robert E. Stilwell et al.

It is certified that error appears in the above-identified patent and that said Letters Patent are hereby corrected as shown below:

Column 2, line 64, "cruvature" should read -- curvature --. Column 3, line 33, after "air" insert -- and --.

Signed and sealed this 2nd day of November 1971.

(SEAL)
Attest:

EDWARD M. FLETCHER, JR.                ROBERT GOTTSCHALK
Attesting Officer                      Acting Commissioner of Patents